(12) United States Patent
Cler et al.

(10) Patent No.: US 10,337,640 B2
(45) Date of Patent: Jul. 2, 2019

(54) VALVE CONNECTED TO A FEED CIRCUIT, A FEED CIRCUIT COMPRISING SUCH A VALVE AND A FEEDING METHOD OPERATING SUCH A FEED CIRCUIT

(71) Applicant: AKWEL SA, Champfromier (FR)

(72) Inventors: Alain Cler, Romans sur Isere (FR); Yves Lamirand, Bourg de Péage (FR); Matthieu Bardin, Chatuzangue le Goubet (FR); Christophe Bondran, Saint Uze (FR)

(73) Assignee: AKWEL SA, Champfromier (FR)

( * ) Notice: Subject to any disclaimer, the term of this patent is extended or adjusted under 35 U.S.C. 154(b) by 0 days.

(21) Appl. No.: 14/975,038

(22) Filed: Dec. 18, 2015

(65) Prior Publication Data

US 2016/0178069 A1 Jun. 23, 2016

(30) Foreign Application Priority Data

Dec. 18, 2014 (FR) ...................................... 14 62782

(51) Int. Cl.
*F16K 31/126* (2006.01)
*F01N 3/20* (2006.01)
(Continued)

(52) U.S. Cl.
CPC .......... *F16K 31/1266* (2013.01); *F01N 3/208* (2013.01); *F01N 3/2066* (2013.01);
(Continued)

(58) Field of Classification Search
CPC .......... Y10T 137/776; Y10T 137/7876; Y10T 137/7771; F01N 2610/02;
(Continued)

(56) References Cited

U.S. PATENT DOCUMENTS 1,636,769 A * 7/1927 Forman .................. B61D 19/02
251/61.3
2,189,750 A * 2/1940 Barge ...................... G01F 15/02
137/505.13
(Continued)

FOREIGN PATENT DOCUMENTS

DE 10 2010 028863 A1 11/2011
DE 10 2012 204104 A1 9/2013
(Continued)

OTHER PUBLICATIONS

Jul. 3, 2015 Search Report issued in French Patent Application No. 1462782.

*Primary Examiner* — Atif H Chaudry
(74) *Attorney, Agent, or Firm* — Oliff PLC

(57) ABSTRACT

This valve includes a first chamber, a second chamber, a seat with a liquid passage, a plug movable between i) an open position and ii) a closed position, and a biasing member for urging the plug toward the closed position. The valve includes an actuating member having a face which sustains an actuating pressure. The actuating member is movable between i) an actuation position for opening the plug and ii) a rest position. The valve operates, selectively: in a feed mode, where the plug is open and the actuating member is at rest, the liquid flowing in one direction throughout the second chamber, or in a latch mode, where the plug is closed and the actuating member is at rest, no liquid flowing in the valve, or in a drain mode, where the plug is open, the liquid flowing in the reverse direction throughout the second chamber.

15 Claims, 2 Drawing Sheets

(51) Int. Cl.
   *F16K 15/18* (2006.01)
   *F15B 13/01* (2006.01)
   *F15B 11/00* (2006.01)
   *F16K 1/34* (2006.01)
   *G05D 16/20* (2006.01)

(52) U.S. Cl.
   CPC ............ *F15B 11/003* (2013.01); *F15B 13/01* (2013.01); *F16K 1/34* (2013.01); *F16K 15/183* (2013.01); *F16K 31/1262* (2013.01); *G05D 16/2066* (2013.01); *F01N 2610/02* (2013.01); *F01N 2610/14* (2013.01); *F01N 2610/144* (2013.01); *F01N 2610/1473* (2013.01); *F01N 2610/1493* (2013.01); *F15B 2211/27* (2013.01); *F15B 2211/30515* (2013.01); *Y02A 50/2325* (2018.01); *Y02T 10/24* (2013.01); *Y10T 137/776* (2015.04); *Y10T 137/7771* (2015.04); *Y10T 137/7876* (2015.04)

(58) Field of Classification Search
   CPC ............ F01N 2610/1473; F01N 3/208; F01N 2610/1493; F15B 13/01; F15B 11/003; F15B 2211/27; F15B 2211/30515; F16K 31/1266; F16K 31/1262
   See application file for complete search history.

(56) References Cited

U.S. PATENT DOCUMENTS

| | | | |
|---|---|---|---|
| 3,747,351 A * | 7/1973 | Wilkerson | F15B 7/006 60/476 |
| 4,361,075 A * | 11/1982 | Block | F15B 13/01 91/420 |
| 5,509,390 A | 4/1996 | Tuckey | |
| 5,749,225 A * | 5/1998 | Olney | F15B 13/01 137/102 |
| 2010/0326546 A1* | 12/2010 | Haeberer | F01N 3/2066 137/558 |
| 2011/0072888 A1 | 3/2011 | Ambrose et al. | |
| 2013/0048120 A1 | 2/2013 | Haeberer | |
| 2015/0068194 A1* | 3/2015 | Gottwald | F01N 3/208 60/274 |

FOREIGN PATENT DOCUMENTS

| | | | |
|---|---|---|---|
| GB | 2 275 989 A | 9/1994 | |
| WO | 2011/048292 A2 | 4/2011 | |
| WO | WO 2013087492 A1 * | 6/2013 | ............ F01N 3/208 |

* cited by examiner

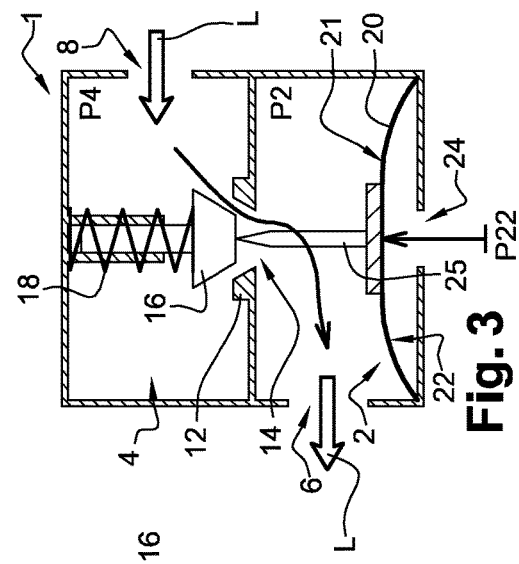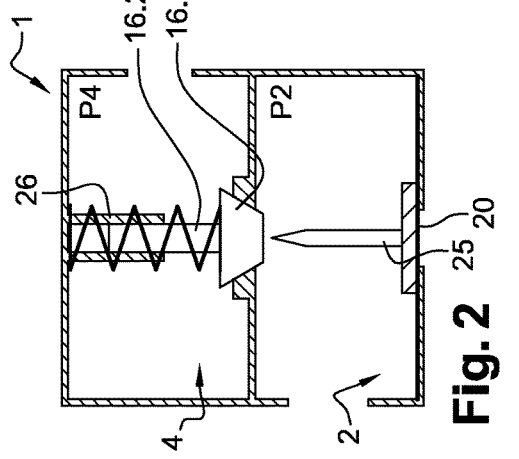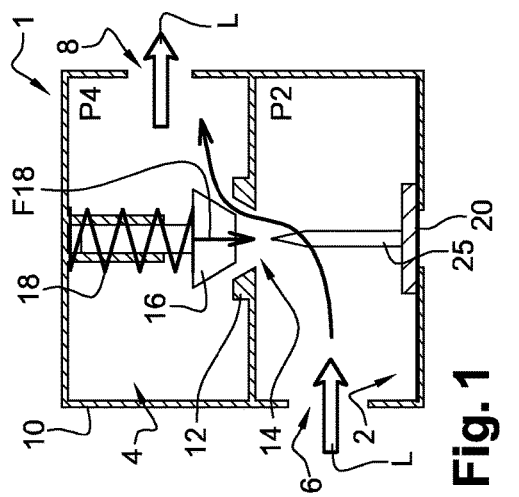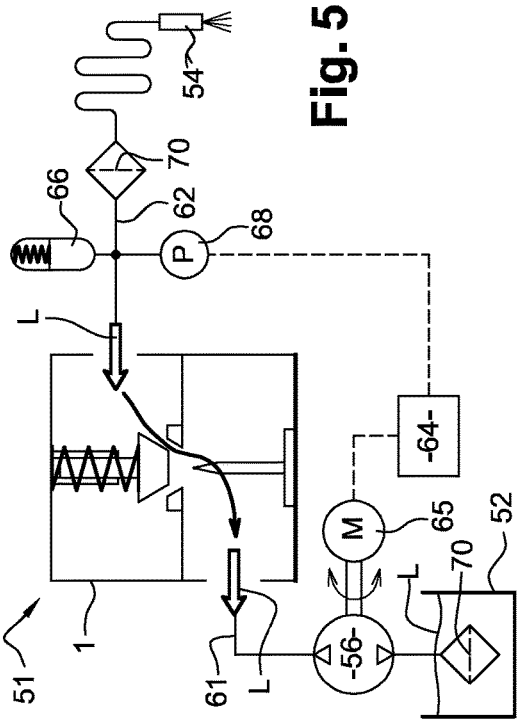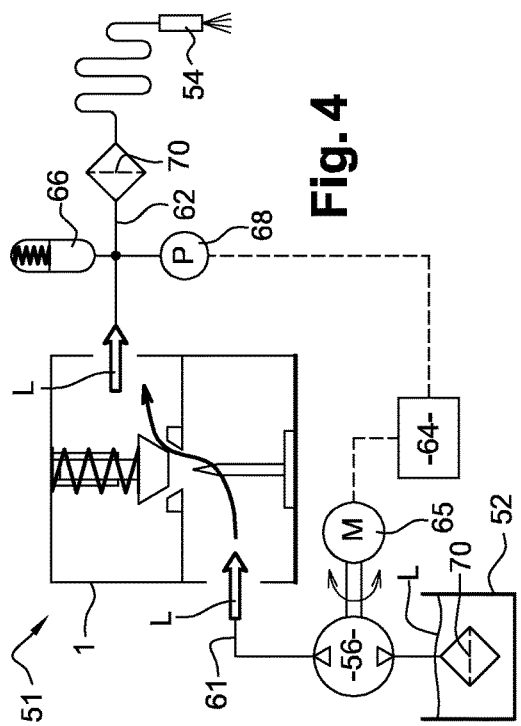

VALVE CONNECTED TO A FEED CIRCUIT, A FEED CIRCUIT COMPRISING SUCH A VALVE AND A FEEDING METHOD OPERATING SUCH A FEED CIRCUIT

The present invention relates to a valve which is intended to be connected to a feed circuit in a motor vehicle. In addition, the present invention relates to a feed circuit which is intended for the flow of a liquid in a motor vehicle. Moreover, the present invention relates to a feeding method for the flow of a liquid in a motor vehicle.

The present invention applies to the flow of liquids in motor vehicles. By motor vehicle, we mean noticeably passenger vehicles, commercial vehicles or industrial vehicles such as trucks. In particular, the present invention may apply to any motor vehicle liquid that has to be set under pressure when used, such as for example, an aqueous urea solution or fuel.

FIG. 1 of WO2011048292A2 illustrates a feed circuit for a motor vehicle, which feed circuit comprises a liquid tank, a liquid-user device, a pump and a valve which is arranged between the pump and the liquid-user device. The valve of WO2011048292A2 is a solenoid valve, that is to say a valve having an electrical control and an electric actuator intended to displace a slide. Depending on the control signals that are sent to this solenoid valve and to the pump, the solenoid valve of WO2011048292A2, and the therefore the circuit, may operate, selectively, in the feed mode, in the latch mode or in the drain mode. Management of the operation modes of the solenoid valve of WO2011048292A2 requires an electronic control unit which operates according to a specific program.

However, such a solenoid valve risks failure in the event of strong electromagnetic disturbances, and this despite of the necessary shielding. Furthermore, during operation, the solenoid valve and the feed circuit of WO2011048292A2 induce a significant consumption of energy. Furthermore, the solenoid valve of WO2011048292A2 requires that the control of the pump is precisely synchronized with the control of the solenoid valve, thereby increasing the cost of the valve and reducing its reliability. In particular, the solenoid valve and the feed circuit of WO2011048292A2 require electrical connectors, electrical cables and a computer program which is adapted to properly synchronize the control of the pump with the control of the solenoid valve, in order to avoid overpressures between the pump and the solenoid valve. However, each of the electrical components as well as the computer program of the solenoid valve are at risk of failure.

For example, the feed circuit risks failure in the event of a shifting of the synchronization of the control of the pump with the control of the solenoid valve. On the one hand, there is a risk of abrupt increase of the pressure of the liquid in the portion of the feed circuit that is located between the pump and the solenoid valve. Such an abrupt increase of the pressure of the liquid may deteriorate several components of the feed circuit. On the other hand, there is a risk of abrupt decrease of the pressure of the liquid in the portion of the feed circuit that is located between the solenoid valve and the liquid-user devices. Such an abrupt decrease of the pressure of the liquid has to be balanced by an overconsumption of energy.

In particular, the present invention aims to resolve all or part of the problems that have been mentioned hereinbefore.

For this purpose, the invention relates to a valve intended to be connected to a feed circuit in a motor vehicle, the valve having at least:

a first port intended to be connected to a pump,
a second port intended to be connected to at least one liquid-user device,
a first chamber connected to the first port,
a second chamber connected to the second port,
a seat presenting a passage arranged so that the liquid can flow between the first port and the second port,
a plug movable between i) an open position, in which the plug is away from the seat so that liquid can flow through the passage, and ii) a closed position, in which the plug bears against the seat so as to block the liquid flow through the passage, and
a biasing member which is configured to generate a biasing force so as to urge the plug toward the closed position,
the valve being characterized in that it further comprises an actuating member having:
a first face which is configured to sustain a pressure of the liquid that is present in the first chamber, and
a second face which is configured to sustain an actuating pressure which is exerted by an actuating fluid so that the actuating member is at least in partially movable between i) an actuation position, in which the actuating member allows placing the plug in the open position, and ii) a rest position, in which the actuating member allows placing the plug in the closed position,
the plug, the biasing member and the actuating member being configured so that the valve operates consecutively:
in a feed mode, the plug is in the open position and the actuating member is in the rest position, so that the liquid flows from the first port toward the second port, or
in a latch mode, the plug is in the closed position and the actuating member is in the rest position, so that no liquid does flow between the first port and the second port, or
in a drain mode, the plug is in the open position and the actuating member is in the actuation position, so that the liquid flows from the second port toward the first port.

Thus, such a valve offers a high reliability, since this valve has no electrical components that risk defecting and since this valve is not sensitive to electromagnetic disturbances. In addition, such a valve consumes no electrical energy, whether in the feed mode or in the drain mode. In addition, such a valve avoids the need for synchronizing the control of the pump and the control of the solenoid valve. Hence, such a valve has a manufacturing cost, an installation cost and an operation cost which are considerably reduced.

Since the first chamber is connected to the first port, the liquid that comes from the first port can fill the first chamber. Thus, the first port transmits the pressure of the liquid to the first chamber.

In the present Application, the term «connect» or any of its derivatives concern the establishment of a fluidic communication of a fluid, a liquid or a gas, between at least two components, that is to say the establishment of a connection that allows a flow of a fluid between these two components, in one direction and/or in the reverse direction. A fluidic communication establishment may be achieved by means of no, or one or several intermediate member(s).

According to a variant of the invention, the biasing member is elastically deformable. For example, the biasing member may be a spring, for instance a helical spring which works in compression. The stiffness of the spring may be comprised between 0.01 N/mm and 1 N/mm, thereby allowing making the valve operate with a pressure of the liquid in the first chamber which is comprised between 0 bar and 9 bar, that is to say between 1 barA (bar absolute) and 10 barA (bar absolute), and with a pressure of the liquid in the second chamber which is comprised between 0 bar and 9 bar, that is to say between 1 barA (bar absolute) and 10 barA (bar absolute).

According to an embodiment of the invention, the plug, the biasing member and the actuating member are sized so that, when in the feed mode, the force that is exerted on the plug and which results from the pressure of the liquid in the first chamber is higher than the sum of i) the force that is exerted on the plug and which results from the pressure of the liquid in the second chamber and ii) the biasing force that is exerted on the plug; and so that, when in the feed mode, the force that is exerted on the actuating member and which results from the pressure of the liquid in the first chamber is higher than the force that is exerted on the actuating member and which results from the actuating pressure.

The force that is exerted on a surface and which results from the pressure of the liquid is equal to the product of the surface area of this surface by the absolute pressure of the liquid. For example, the force that is exerted on the actuating member and which results from the actuating pressure is equal to the product of i) the surface area of the surface of the actuating member that is exposed to the actuating fluid by ii) the absolute actuating pressure.

Thus, when in the feed mode, such a valve allows feeding a feed circuit. For example, in the case where the feed circuit comprises a pump and a liquid-user device, such as an accumulator and/or a device for injecting or spraying the liquid, such a valve allows making the liquid circulate from the pump toward the accumulator and/or a device for injecting or spraying the liquid.

According to an embodiment of the invention, the plug, the biasing member and the actuating member are sized so that, when in the latch mode, the force that is exerted on the plug and which results from the pressure of the liquid in the first chamber is lower than the sum of i) the force that is exerted on the plug and which results from the pressure of the liquid in the second chamber and ii) the biasing force that is exerted on the plug; and so that, when in the latch mode, the force that is exerted on the actuating member and which results from the pressure of the liquid in the first chamber is higher than or equal to the force that is exerted on the actuating member and which results from the actuating pressure.

Thus, when in the latch mode, such a valve allows holding under pressure the liquid in a portion of the feed circuit that is located toward the second chamber. For example, in the case where the feed circuit comprises a pump and a liquid-user device, such as an accumulator, such a valve allows holding under pressure the liquid in a portion of the feed circuit that is located toward the accumulator.

According to an embodiment of the invention, the plug, the biasing member and the actuating member are sized so that, when in the drain mode, the force that is exerted on the plug and which results from the pressure of the liquid in the first chamber is lower than the force that is exerted on the plug and which results from the pressure of the liquid in the second chamber; and so that, when in the drain mode, the force that is exerted on the actuating member and which results from the actuating pressure is higher than the force resulting from:

i) the force that is exerted on the actuating member and which results from the pressure of the liquid in the first chamber, ii) the biasing force that is exerted on the plug, iii) the force that is exerted on the plug and which results from the pressure of the liquid in the first chamber, and iv) the force that is exerted on the plug and which results from the pressure of the liquid in the second chamber.

Thus, when in the drain mode, such a valve allows draining a feed circuit. For example, in the case where the feed circuit comprises a pump and a liquid-user device, such as an accumulator, such a valve allows draining the accumulator as well as the rest of the feed circuit, by making the liquid circulate from the accumulator toward the pump.

According to a variant of the invention, when in a stop mode, the plug, the biasing member and the actuating member are sized so that the plug remains in the closed position when the pressure of the liquid in the first chamber is equal to the pressure of the liquid in the second chamber, and when the pressure of the liquid in the first chamber is equal to the actuating pressure.

According to a variant of the invention, the actuating member presents a first face having a surface area which is comprised between 200 mm$^2$ and 800 mm$^2$, for instance between 400 mm$^2$ and 600 mm$^2$.

According to an embodiment of the invention, the actuating member comprises a membrane which is elastically deformable.

Thus, such a membrane allows forming an actuating member which is compact, since the elastically-deformable membrane returns by itself to the rest position, without the need for an additional component such as a spring. In this embodiment, the actuating member is movable, only in part, relative to the first chamber.

When in the drain mode, the force that is exerted on the actuating member and which results from the actuating pressure is higher than the force resulting from:

i) the force that is exerted on the actuating member and which results from the pressure of the liquid in the first chamber, ii) the biasing force that is exerted on the plug, iii) the elastic biasing force that is generated by the elasticity of the elastic membrane; in fact, the elasticity of the elastic membrane generates an elastic biasing force which tends to urge the elastic membrane toward its rest position, iv) the force that is exerted on the plug and which results from the pressure of the liquid in the first chamber, and v) the force that is exerted on the plug and which results from the pressure of the liquid in the second chamber.

According to a variant of the invention, when in the actuation position, the membrane presents a central portion which is deformed and a peripheral portion which remains immobile with respect to the first chamber.

According to a variant of the invention, the actuating member comprises a piston which is movable in translation inside the first chamber.

Thus, such a piston allows forming an actuating member which is reliable and which is capable of sustaining high pressures of the liquid and the actuating fluid. In this embodiment, the actuating member is fully movable relative to the first chamber.

According to an embodiment of the invention, the valve comprises biasing means which are configured to urge the actuating member in the rest position.

Thus, such biasing means allow urging the actuating member in the rest position when the pressure of the liquid in the first chamber is higher than or equal to the actuating pressure. In the embodiment where the actuating member comprises a membrane which is elastically deformable, the biasing means are formed by the membrane itself, the elasticity of which membrane urges the deformed portion in the rest position.

According to a variant of the invention, the surface area of the surface of the membrane that is exposed to the actuating fluid is wider, for example 10 times wider, than the surface of the plug that is exposed to the pressure of the liquid in the second chamber. Thus, the combined forces of the pressure of the liquid and those of the biasing member on the plug are lower than the force that results from the actuating pressure on the membrane. Hence, the membrane can actuate, and therefore displace, the plug toward its open position.

According to an embodiment of the invention, the actuating member is disposed inside the first chamber, and the first chamber presents a hole intended to convey the actuating fluid toward the second face.

Thus, such a valve is compact, since the actuating member is inside the first chamber. The linkage between the actuating member and the first chamber is tightly sealed from the liquid.

According to an embodiment of the invention, the valve further comprises an opening member disposed between the plug and the actuating member so as to transmit, to the plug, a force which results from the actuating pressure.

Thus, such an opening member simplifies the construction of the valve, since the actuating member may be placed at a certain distance away from the plug.

According to a variant of the invention, the opening member is linked to the actuating member. For example, the opening member may be secured to the actuating member. In this variant, the opening member may be integral with the membrane. According to another example, the opening member may be connected to the actuating member via a planar linkage, the opening member and the actuating member being capable of being brought at a distance away from one another when the actuating member is in the rest position.

In the present Application, the term "link" and its derivatives refer to a mechanical linkage between two components which enables no or one or several degree(s) of freedom. For example, the mechanical linkage may be a ball-joint linkage, a pivot linkage, a planar linkage or an attachment linkage.

According to an embodiment of the invention, the opening member is generally in the form of a rod extending along an actuation direction, the opening member presenting, when viewed in section in a plane transverse to the actuation direction, recesses which are configured for the flow of the liquid substantially parallel to the actuation direction. For example, the opening member may present four recesses, so that the rod has a cross-shaped cross-section.

Thus, such an opening member allows the liquid to flow between the first port and the second port when the first port is defined out of the first chamber.

According to an embodiment of the invention, the first port is connected to the passage via a channel, and the first chamber is connected to the first port via a connection port.

Thus, such a structure allows sealing the first chamber from the liquid flow that passes throughout the valve when operating in the feed mode or in the drain mode, thereby minimizing, and even avoiding, separations and other hydraulic disturbances that may occur at the actuating member.

According to a variant of the invention, the valve further comprises a body in which the first chamber and the second chamber are formed. In other terms, the body forms an external enclosure for the valve.

According to a variant of the invention, the plug is selected in the group constituted by a clapper, a ball and a frustoconical element, the plug may be made of an elastomer and/or a metal.

According to a variant of the invention, the actuating member is formed by a reinforced membrane comprising a textile fabric overmolded with an elastomer.

According to a variant of the invention, the valve further comprises a guide which is arranged in the second chamber so as to guide the plug between the closed position and the open position.

According to a variant of the invention, the plug comprises at least two components. For example, the plug may comprise a plugging member and a guide member. The guide member may have a general shape which is complementary to the guide that belongs to the valve.

In addition, the present invention relates to a feed circuit, intended for the flow of a liquid in a motor vehicle, the feed circuit comprising at least:
 a liquid tank,
 a liquid-user device which is configured to use the liquid,
 a pump which is configured to make the liquid circulate between the liquid tank and the liquid-user device, the pump being for instance a bidirectional pump, and
 a valve according to the invention, the valve being arranged between the pump and the liquid-user device, the first port being connected to the pump, the second port being connected to the liquid-user device, the valve operating, selectively, in the feed mode, in the latch mode or in the drain mode.

Thus, such a feed circuit can operate, with a high reliability, in feed, latch and drain modes. In fact, the valve has no electrical components that risk failing and this valve is not sensitive to electromagnetic disturbances. In addition, such a feed circuit consumes less electrical energy or not at all, whether during the pumping phases or during the draining phases. Hence, such a feed circuit has a manufacturing cost, an installation cost and an operation cost which are considerably reduced.

Thus, such a control unit allows placing the feed circuit selectively in the feed mode, in the latch mode or in the drain mode. In fact, the control unit can control the pump so as to obtain a determined pressure in the first chamber, thereby allowing selecting the operation mode.

According to an embodiment of the invention, the feed circuit further comprises a control unit which is configured to control the pump, the control unit being configured to control the pump, selectively, so as:
 to increase the pressure of the liquid in the first chamber so that the valve operates in the feed mode, or
 to stop the pump so that the valve operates in the latch mode, or
 to decrease the pressure of the liquid in the first chamber so that the valve operates in the drain mode.

According to an embodiment of the invention, the feed circuit further comprises:
 an accumulator which is configured to contain a variable volume of the liquid at a variable pressure, and
 a pressure sensor which is arranged for measuring the pressure of the liquid that is present in the accumulator, the pressure sensor being configured to transmit, to the control unit, signals which are representative of the pressure of the liquid that is present in the accumulator.

Thus, such an accumulator allows storing the liquid under pressure, thereby avoiding the need for continuously operating the pump. In fact, when the valve is in the latch mode, the liquid that is contained in the portion of the feed circuit that is located between the valve and the liquid-user member can remain at a usable pressure which slowly decreases. When the pressure of the liquid falls below a predetermined threshold, the control unit can reactivate the pump, in order to raise again the pressure of the liquid. The pressure sensor provides the control unit with the value of the pressure of the liquid that is present in the second chamber, which chamber is connected to the accumulator.

According to a variant of the invention, the pressure sensor may be directly connected to the accumulator. As an alternative to this variant, the pressure sensor may be placed downstream of a filter which is connected to the accumulator.

According to an embodiment of the invention, the actuating member is disposed inside the first chamber and the first chamber presents a hole intended to convey the actuating fluid toward the second face; the actuating fluid is air that surrounds the valve and which is substantially at the atmospheric pressure.

According to an embodiment of the invention, the feed circuit is an additive injection circuit, the liquid being an aqueous urea solution.

Thus, such an additive injection circuit allows reducing the nitrogen oxides (NOx) that are present in the exhaust gases.

As an alternative to this embodiment, the feed circuit may be a fuel feed circuit which is configured to feed an internal combustion engine, the liquid being a fuel. Thus, such a fuel feed circuit with such a valve allows rapidly shutting down and restarting the internal combustion engine.

Moreover, the present invention relates to a feeding method, for the flow of a liquid in a motor vehicle, the feeding method comprising the consecutive steps of:
  providing a feed circuit which is configured to operate, selectively, in the feed mode, in the latch mode or in the drain mode,
  increasing the pressure of the liquid in the first chamber so that the valve operates in the feed mode, or
  stopping the pump so that the valve operates in the latch mode, or
  decreasing the pressure of the liquid in the first chamber so that the valve operates in the drain mode.

The embodiments and the variants that have been mentioned hereinbefore may be considered separately or according to any technically possible combination.

The present invention will be better understood and its advantages will also appear in the light of the description that follows, given only but as a non-limiting example and with reference to the appended drawings, in which:

FIG. 1 is a schematic sectional view of a valve in accordance with a first embodiment of the invention during its operation in the feed mode;

FIG. 2 is a view similar to FIG. 1 of the valve of FIG. 1 during its operation in the latch mode;

FIG. 3 is a view similar to FIG. 1 of the valve of FIG. 1 during its operation in the drain mode;

FIG. 4 is a schematic sectional view of a feed circuit in accordance with a first embodiment of the invention and comprising a valve in accordance with the invention during its operation in the feed mode;

FIG. 5 is a view similar to FIG. 4 of the feed circuit of FIG. 4 during its operation in the drain mode;

Figure 8:
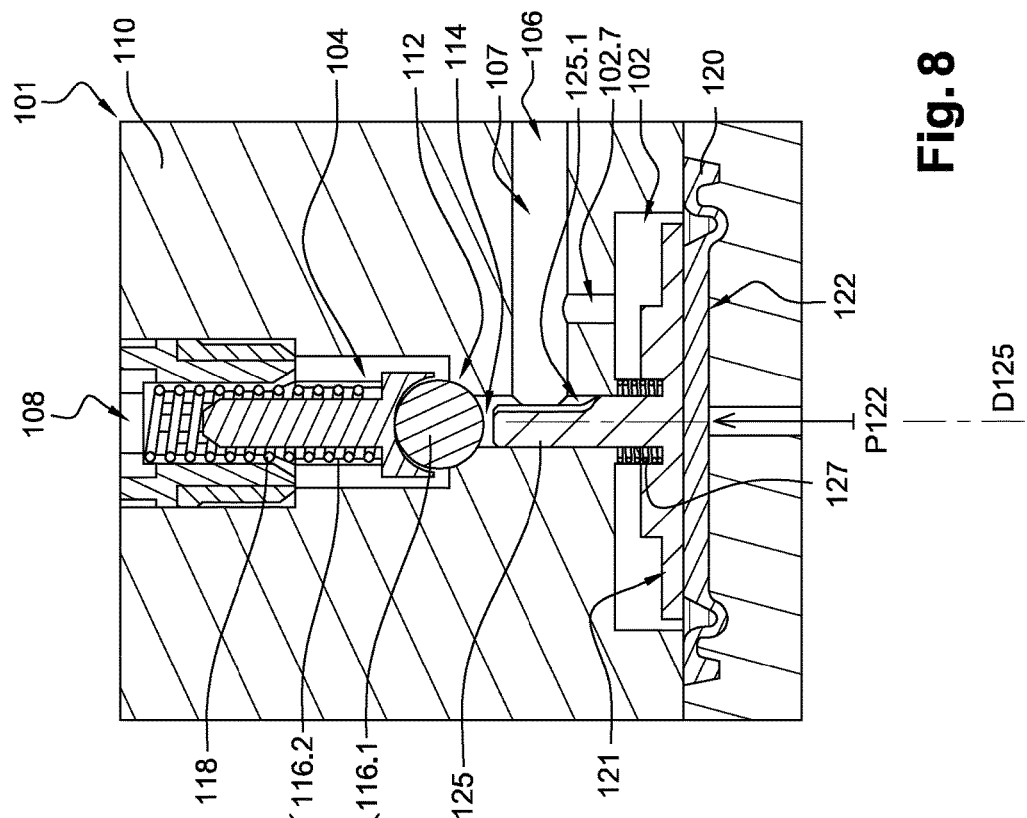
FIG. 8 is a sectional view illustrating the structure of the valve of FIGS. 6 and 7, during its operation in the latch mode.

FIGS. 1, 2 and 3 illustrate a valve 1 intended to be connected to a feed circuit 51 such as that illustrated in FIGS. 4 and 5. In the example of FIGS. 4 and 5, the feed circuit 51 being an additive injection circuit, the liquid L being an aqueous urea solution. Such an additive injection circuit allows reducing the nitrogen oxides (NOx) that are present in the exhaust gases.

The valve 1 has a first port 6 and a second port 8. The valve 1 comprises a first chamber 2 and a second chamber 4. The first chamber 2 is connected to the first port 6. The first port 6 is connected, via a first conduit 61, to a pump 56 which belongs to the feed circuit 51. The second chamber 4 is connected to the second port 8. The second port 8 is connected, via a second conduit 62, to a liquid-user device 54 which belongs to the feed circuit 51.

In the example of FIGS. 1 to 5, the liquid-user device 54 comprises a device for injecting the liquid in an exhaust line of a motor vehicle. For example, this injection device may for instance be a boom which is equipped with spray nozzles intended to spray the liquid.

Depending on the direction of the liquid L flow, the first port 6 acts as an inlet or as an outlet of the liquid L, respectively, into or out of the first chamber 2. Depending on the direction of the liquid L flow, the second port 8 acts as an inlet or as an outlet of the liquid L, respectively, into or out of the second chamber 4. The second port serves alternately as an inlet and as an outlet of the liquid into and out of the second chamber.

In the example of FIGS. 1 to 5, the valve 1 further comprises a body 10 in which the first chamber 2 and the second chamber 4 are formed. The body 10 forms an external enclosure for the valve 1.

The valve 1 further comprises a seat 12 which presents a passage 14. The passage 14 is arranged so that the liquid L could flow between the first port 6 and the second port 8, in one direction or in the reverse direction. In the example of FIGS. 1 to 5, the passage 14 is arranged so that the liquid L could flow between the first chamber 2 and the second chamber 4, in one direction or in the reverse direction.

In addition, the valve 1 comprises a plug 16 which is movable between i) an open position (FIGS. 1, 3, 4 and 5) and ii) a closed position (FIG. 2). When in the open position, the plug 16 is away from the seat 12 so that liquid L under a feed pressure could flow through the passage 14. When in the closed position (FIG. 2), the plug 16 bears against the seat 12 so as to block the liquid L flow through the passage 14. Hence, the plug 16 allows sealing the opposite portions of the feed circuit 51, that is to say the portions that are located at either side of the valve 1.

The valve 1 further comprises a biasing member 18 which is configured to generate a biasing force F18 so as to urge the plug 16 toward the closed position (FIGS. 1 and 3). In the example of FIGS. 1 to 5, the biasing member 18 is elastically deformable and it is a helical spring which works in compression. In this instance, the stiffness of the spring is equal to about 0.07 N/mm, thereby allowing making the valve 1 operate with a pressure of the liquid L in the first chamber 2 which is comprised between 0 bar and 9 bar (relative pressure) and with a pressure of the liquid L in the second chamber 4 which is comprised between 0 bar and 9 bar (relative pressure).

The valve 1 further comprises an actuating member 20 which is configured to actuate the plug 16. The actuating member 20 has a first face 21 and a second face 22. The first face 21 is configured to sustain a pressure P2 of the liquid L that is present in the first chamber 2. The second face 22 is configured to sustain an actuating pressure P22 which is exerted by an actuating fluid. In this instance, the first face 21 and the second face 22 have surface areas which are approximately equal to each other.

In the example of FIGS. 1 to 5, the actuating fluid is air that surrounds the valve 1; the actuating pressure P22 is the atmospheric pressure. The resultant of the actuating pressure P22 on the second face 22 is symbolized in FIG. 3.

In this instance, the actuating member 20 is disposed inside the first chamber 2. As is shown in FIG. 3, the first chamber 2 presents a hole 24 intended to convey the actuating fluid (the air) toward the second face 22.

In the example of FIGS. 1 to 5, the actuating member 20 comprises a membrane which is elastically deformable. When in the actuation position (FIGS. 3 and 5), the membrane presents a central portion which is deformed and a peripheral portion which remains immobile with respect to the first chamber 2. Hence, the actuating member 20 is movable, only in part, relative to the first chamber 2. Since only the central portion of the membrane is movable, whereas the peripheral portion remains immobile, the actuating member 20 is partially movable between i) an actuation position (FIGS. 3 and 5) and ii) a rest position (FIGS. 1, 2 and 4).

When in the actuation position, the actuating member 20 allows placing the plug 16 in the open position. When in the rest position (FIGS. 1, 2 and 4), the actuating member 20 allows placing the plug 16 in the closed position. Hence, during operation, the actuating member 20 converts a pressure difference into a displacement work.

The valve 1 further comprises biasing means which are configured to place the actuating member 20 in the rest position (FIGS. 1, 2 and 4). In this instance, the biasing means, the biasing means are formed by the membrane itself, the elasticity of which membrane urges the deformed portion in the rest position.

The valve 1 further comprises an opening member 25 which is disposed between the plug 16 and the actuating member 20 so as to transmit, to the plug 16, the force that results from the actuating pressure P22. The opening member 25 is in flat contact with the actuating member 20. In the example of FIGS. 1 to 5, the opening member 25 is forms by a needle, or pin, which has a generally rectilinear shape. Alternatively, the opening member 25 may be secured to the actuating member 20.

As is shown in FIG. 2, the valve 1 further comprises a guide 26 which is arranged in the second chamber 4 so as to guide the plug 16 between the closed position (FIG. 2) and the open position (FIGS. 1, 3, 4 and 5). In this instance, the plug 16 includes a plugging portion 16.1, which is frusto-conical, as well as a rod 16.2. The guide 26 has a general shape which is complementary to the rod 16.2. In this instance, the plug is made of a metal, for example a stainless steel.

The plug 16, the biasing member 18 and the actuating member 20 are configured so that the valve 1 operates consecutively:
  in a feed mode (FIGS. 1 and 4): the plug 16 is in the open position and the actuating member 20 is in the rest position, so that the liquid L flows from the first chamber 2 toward the second chamber 4, as is shown by the arrows which pass via the first port 6 and via the second port 8, or
  in a latch mode (FIG. 2): the plug 16 is in the closed position and the actuating member 20 is in the rest position, so that no liquid L does flow through the passage 14, or
  in a drain mode (FIGS. 3 and 5): the plug 16 is in the open position and the actuating member 20 is in the actuation position, so that the liquid L flows from the second chamber 4 into the first chamber 2, as is shown by the arrows which pass via the first port 6 and via the second port 8.

Hence, the valve 1 operates selectively in the feed mode (FIGS. 1 and 4), in the latch mode (FIG. 2) or in the drain mode (FIGS. 3 and 5).

In particular, the plug 16, the biasing member 18 and the actuating member 20 are sized so that, when in the feed mode (FIGS. 1 and 4):
  on the one hand, the force that is exerted on the plug 16 and which results from the pressure P2 of the liquid L in the first chamber 2 is higher than the sum of i) the force that is exerted on the plug 16 and which results from the pressure P4 of the liquid L in the second chamber 4 and ii) the biasing force F18 that is exerted on the plug 16, and
  on the other hand, the force that is exerted on the first face 21 of the actuating member 20 and which results from the pressure P2 of the liquid in the first chamber 2 is higher than the force that is exerted on the second face 22 of the actuating member 20 and which results from the actuating pressure P22.

In the example of FIGS. 1 to 5, the second face 22 has a surface area equal to about 500 mm$^2$.

In addition, the plug 16, the biasing member 18 and the actuating member 20 are sized so that, when in the latch mode (FIG. 2):
  on the one hand, the force that is exerted on the plug 16 and which results from the pressure P2 of the liquid L in the first chamber 2 is lower than the sum of i) the force that is exerted on the plug 16 and which results from the pressure P4 of the liquid L in the second chamber 4 and ii) the biasing force F18 that is exerted on the plug 16, and
  on the other hand, the force that is exerted on the first face 21 of the actuating member 20 and which results from the pressure P2 of the liquid L in the first chamber 2 is higher than the force that is exerted on the second face 22 of the actuating member 20 and which results from the actuating pressure P22.

Similarly, the plug 16, the biasing member 18 and the actuating member 20 are sized so that, when in the drain mode (FIGS. 3 and 5):
  on the one hand, the force that is exerted on the plug 16 and which results from the pressure P2 of the liquid L in the first chamber 2 is lower than the force that is exerted on the plug 16 and which results from the pressure P4 of the liquid L in the second chamber 4, and
  on the other hand, the force that is exerted on the actuating member 20 by the actuating pressure P22 is higher than the force resulting from:
    i) the force that is exerted on the plug 16 by the pressure P2 of the liquid L in the first chamber 2,
    ii) the force that is exerted on the plug 16 by the pressure P4 of the liquid L in the second chamber 4,
    iii) the force that is exerted on the plug 16 by the biasing member 18,
    iv) the force that is exerted on the first face 21 by the pressure P2 of the liquid L in the first chamber 2, and v) the elastic biasing force that is generated by the elasticity of the elastic membrane.

The feed circuit 51 is intended to make a liquid L circulate in a motor vehicle. As is shown in FIGS. 4 and 5, the feed circuit 51 comprises the valve 1, a liquid tank 52, the liquid-user device 54 and the pump 56. The valve 1 is arranged between the pump 56 and the liquid-user device 54.

The liquid-user device 54 is configured to use the liquid L. The pump 56 is configured to make the liquid L circulate between the liquid tank 52 and the liquid-user device 54. The pump 56 is a bidirectional pump, that is to say a pump that allows the flow of the liquid L in both directions: not only from the pump 56 toward the liquid-user device 54, but also from the liquid-user device 54 toward the pump 56.

In the example of FIGS. 4 and 5, the feed circuit 51 is an additive injection circuit, the liquid L being an aqueous urea solution.

The feed circuit 51 further comprises a control unit 64 which is configured to control the pump 56. In this instance, the control unit 64 controls an electric motor 65 which belongs to the pump 56. The control unit 64 allows placing the feed circuit 51, selectively, in the feed mode, in the latch mode or in the drain mode.

When in the feed mode (FIGS. 1 and 4), the feed circuit 51 allows making the liquid circulate from the pump 56 toward the liquid-user device 54. When in the latch mode (FIG. 2), the feed circuit 51 allows holding under pressure the liquid in a portion of the feed circuit 51 that is located toward the second chamber 4. When in the drain mode (FIGS. 3 and 5), the feed circuit 51 can be drained by the pump 56.

The control unit 64 can control the pump 56 so as to obtain a determined pressure in the first chamber 2, thereby allowing selecting the operation mode of the feed circuit 51.

To this end, the control unit 64 is configured, for example by means of a specific algorithm, to control the pump 56, selectively, so as:

to increase the pressure P2 of the liquid in the first chamber 2 so that the valve 1 operates in the feed mode (FIGS. 1 and 4), or to stop the pump 56 so that the valve 1 operates in the latch mode (FIG. 2), or to decrease the pressure P2 of the liquid in the first chamber 2 so that the valve 1 operates in the drain mode (FIGS. 3 and 5).

The feed circuit 51 further comprises an accumulator 66 which is configured to contain a variable volume of the liquid L at a variable pressure. In addition, the feed circuit 51 comprises a pressure sensor 68 which is arranged for measuring the pressure of the liquid L that is present in the accumulator 66.

In the example of FIGS. 4 and 5, the pressure sensor 68 is directly connected to the accumulator 66. The pressure sensor 68 is configured to transmit, to the control unit 64, signals which are representative of the pressure of the liquid L that is present in the accumulator 66.

The accumulator 66 allows storing the liquid L under pressure, thereby avoiding the need for continuously operating the pump 56. In fact, when the valve 1 is in the latch mode (FIG. 2), the liquid L that is contained in the portion of the feed circuit 51 that is located between the valve 1 and the liquid-user member 54 can remain at a usable pressure which slowly decreases as it is used by the liquid-user device 54.

When the pressure of the liquid L falls below a predetermined threshold, the control unit 64 can reactivate the pump 56, in order to raise again the pressure of the liquid L. The pressure sensor 68 provides the control unit 64 with the value of the pressure of the liquid L that is present in the second chamber 4, which chamber is connected to the accumulator 66.

Moreover, the feed circuit 51 comprises two filters 70 which are respectively disposed in the tank 52 and between the accumulator 66 and the user device 54. The filters 70 serve to filter the solid particles in the liquid L.

During operation, the feed circuit 51 operates according to a feeding method comprising the consecutive steps of:

(FIG. 4) providing a feed circuit 51, increasing the pressure of the liquid in the first chamber 2, by means of the pump 56, so that the valve 1 operates in the feed mode (FIGS. 1 and 4), or stopping the pump 56 so that the valve 1 operates in the latch mode (FIG. 2), or decreasing the pressure P2 in the first chamber 2 so that the valve 1 operates in the drain mode (FIGS. 3 and 5).

When in the feed mode, the pump 56 increases the pressure P2 of the liquid L in the first chamber 2, so that the pressure of the liquid P2 becomes higher than the sum of the biasing force F18 and the pressure P4 of the liquid L in the second chamber 4. The plug 16 can switch in the open position so as to let the liquid L pass toward the user device 54.

When in the latch mode, the pump 56 is stopped, so that the pressure P2 of the liquid L in the first chamber 2 and in the pump 56 could fall down to the atmospheric pressure. Depending on the construction of the valve 1, it is possible that a low residual pressure P2 remains in the first conduit 61 and in the first chamber 2, which residual pressure depends on the pressure drops that are generated by the different hydraulic components that are involved. The pressure P4 of the liquid L in the second chamber 4 then holds the plug 16 in the closed position, thereby sealing the portion of the feed circuit 51 that is located between the valve 1 and the user device 54. In this portion, the accumulator 66 can deliver pressurized liquid L toward the user device 54.

When in the drain mode, the pump 56 rotates in the reverse direction, so that the vacuum that is created by the pump 56 in the first chamber 2 pulls the opening member 25 against the plug 16, thereby displacing the plug 16 in the open position against the biasing force F18. At the end of the drain mode, the vacuum that is created by the pump 56 decreases when the pump 56 rotates in partially idle conditions. Then, the plug 16 switches again in the closed position by the effect of the biasing member 18.

Figure 6:
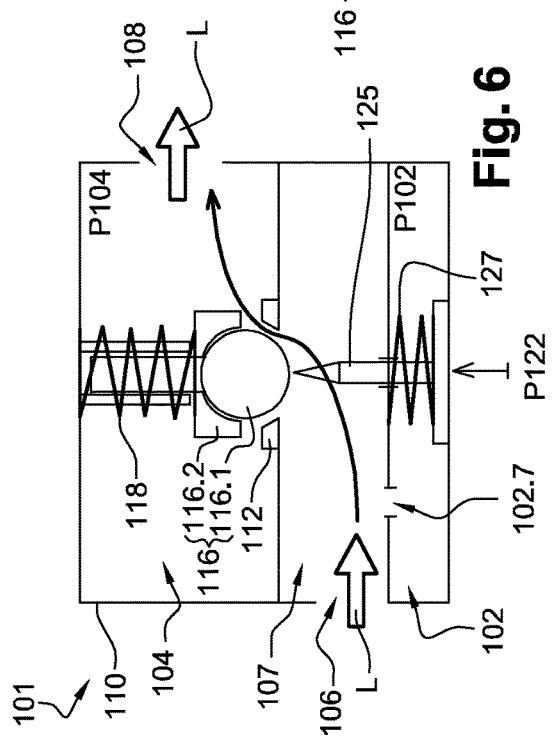
FIG. 6 is a view similar to FIG. 1 of a valve in accordance with a second embodiment of the invention, during its operation in the feed mode.
Figure 7:
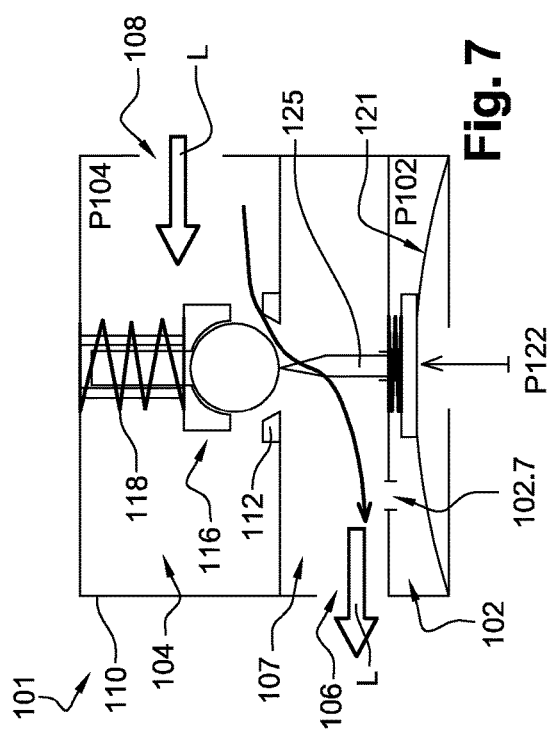
FIG. 7 is a view similar to FIG. 6 of the valve of FIG. 6, during its operation on the latch mode.

FIGS. 6, 7 and 8 illustrate a valve 101 in accordance with a second embodiment of the invention. To the extent that the valve 101 is similar to the valve 1, the description of the valve 1 that has been given hereinbefore, in connection with FIGS. 1 to 5 may be transposed to the valve 101, with the exception of the significant differences that are set forth hereinafter.

A component of the valve 101 that is identical or corresponding, either because of its structure or because of its function, to a component of the valve 1 carries the same reference numeral incremented by 100. Thus, there are defined a first port 106, a second port 108, a first chamber 102, a second chamber 104, a body 110, a seat 112 presenting a passage 114, a plug 116, a biasing member 118, an actuating member 120 with a first face 121 and a second face 122 and an opening member 125.

The valve 101 differs from the valve 1, since the valve 101 further presents a channel 107 and a connection port 102.7. The channel 107 is arranged for connecting together the first port 106 and the passage 114. When in the feed mode (FIG.

6), the liquid L, which comes from a pump which is not represented, enters inside the valve 101 via the first port 106, and then, it flows in the channel 107 before passing through the passage 114 and passes inside the second chamber 104, and then, it comes out via the second port 108. Hence, the flow of the liquid L does not pass throughout the first chamber 102.

On the contrary, when the valve 1 operates in the feed mode, the liquid L enters via the first port 6, and then, it flows throughout the first chamber 2 before passing through the passage 14.

Nonetheless, the liquid L fills the first chamber 102 by passing via the connection port 102.7 from the channel 107. Thus, the pressure P102 of the liquid L in the first chamber 102 is equal to the pressure of the liquid L in the channel 107.

In addition, the valve 101 differs from the valve 1, since the valve 101 further comprises a biasing element 127 which is arranged for urging the actuating member 120 in the rest position (FIG. 6). In the example of FIGS. 6 and 7, the biasing element 127 is a helical spring which is arranged so as to work in compression against the seat 112 and against the membrane that forms the actuating member 120.

Because of the biasing force that is exerted by the biasing element 127, the plug 116, the biasing member 118, the actuating member 120 and the biasing element 127 are sized so that, when in the drain mode (FIG. 7):
 on the one hand, the force that is exerted on the plug 116 and which results from the pressure P102 of the liquid L in the channel 107 (which pressure is equal to the pressure of the liquid in the first chamber 102) is lower than the force that is exerted on the plug 116 and which results from the pressure P104 of the liquid L in the second chamber 104, and
 on the other hand, the force that is exerted on the actuating member 120 and which results from the actuating pressure P122 is higher than the force resulting from:
 i) the force that is exerted on the plug 116 by the pressure P102 of the liquid L in the channel 107,
 ii) the force that is exerted on the plug 116 by the pressure P104 of the liquid L in the second chamber 104,
 iii) the force that is exerted on the first face 121 by the pressure P102 of the liquid L in the channel 107,
 iv) the force that is exerted on the plug 116 by the biasing member 118, and
 v) the force that is exerted on the actuating member 120 by the biasing element 127, and
 vi) the elastic biasing force that is eventually generated by the elasticity of the elastically-deformable membrane that forms the actuating member 120.

Furthermore, the valve 101 differs from the valve 1, since the plug 116 comprises two components: a plugging member 116.1 and a guide member 116.2. The plugging member 116.1 serves to plug the passage 114 and the guide member 116.2 serves to guide the plugging member 116.1 substantially in translation between the open position and the closed position (FIG. 8). In the example of FIG. 8, the plugging member 116.1 is a ball and the guide member 116.2 comprises a rod and a receptacle intended to receive the ball.

The opening member 125 has a general shape of a rod extending along an actuation direction D125. The valve 101 further differs from the valve 1, since the opening member 125 presents, when viewed in section in a plane transverse to the actuation direction D125, at least one recess 125.1.

The recess 125.1 is configured for the flow of the liquid substantially parallel to the actuation direction D125, between the passage 114 and the channel 107. Thus, the opening member 125 allows the liquid to flow between the first port 106 and the second port 108.

Moreover, in the feed mode (FIG. 6) as well as in the drain mode, the valve 101 operates in the same fashion as the valve 1. In fact, the biasing force that is exerted by the biasing element 127 does not intervene in the feed mode (FIG. 6), nor does it intervene in the drain mode, since the actuating member 120 is then in the rest position.

Of course, the present invention is not limited to the particular embodiments that have been described in the present Patent Application, nor is it limited to embodiments that are within the reach of those skilled in the art. Other embodiments may be considered without departing from the scope of the invention, from any element equivalent to an element that has been indicated in the present Patent Application.

The invention claimed is:

1. A feed circuit, configured for the flow of a liquid in a motor vehicle, the feed circuit comprising at least:
 a liquid tank,
 a liquid-user device which is configured to use the liquid,
 a pump which is configured to make the liquid circulate between the liquid tank and the liquid-user device, and
 a valve, the valve being arranged between the pump and the liquid-user device, the valve operating, selectively, in a feed mode, in a latch mode or in a drain mode; wherein the valve comprises:
 a first port configured for being connected to the pump and the liquid tank,
 a second port configured for being connected to the at least one liquid-user device,
 a first chamber connected to the first port,
 a second chamber connected to the second port,
 a seat presenting a passage arranged so that the liquid can flow between the first port and the second port,
 a plug movable between i) an open position, in which the plug is away from the seat so that liquid can flow through the passage, and ii) a closed position, in which the plug bears against the seat so as to block the liquid flow through the passage, and
 a biasing member which is configured to generate a biasing force so as to urge the plug toward the closed position,
 an actuating member having:
 a first face which is configured to sustain a pressure of the liquid that is present in the first chamber, and
 a second face which is configured to sustain an actuating pressure which is exerted by an actuating fluid so that the actuating member is at least in partially movable between i) an actuation position, in which the actuating member allows placing the plug in the open position, and ii) a rest position, in which the actuating member allows placing the plug in the closed position,
 the plug, the biasing member and the actuating member being configured so that the valve operates consecutively:
 in the feed mode, the plug is in the open position and the actuating member is in the rest position, so that the liquid flows from the first port toward the second port, or
 in the latch mode, the plug is in the closed position and the actuating member is in the rest position, so that no liquid does flow between the first port and the second port, or
 in the drain mode, the plug is in the open position and the actuating member is in the actuation position, so that the liquid flows from the at least one liquid-user device into the second port of the valve and out of the first port of the value in order to reach the pump and the liquid tank, the pump being configured to be arranged between the first port of the valve and the liquid tank, wherein the valve is configured such that the liquid in flowing from the at least one liquid-user device to the liquid tank passes into and out of the valve and the pump a single time;

wherein the feed circuit further comprises:
an accumulator which is configured to contain a variable volume of the liquid at a variable pressure, and
a pressure sensor which is arranged for measuring the pressure of the liquid that is present in the accumulator, the pressure sensor being configured to transmit, to a control unit, signals which are representative of the pressure of the liquid that is present in the accumulator.

2. The feed circuit according to claim 1, wherein the control unit is configured to control the pump, selectively, so as:
to increase the pressure of the liquid in the first chamber so that the valve operates in the feed mode, or
to stop the pump so that the valve operates in the latch mode, or
to decrease the pressure of the liquid in the first chamber so that the valve operates in the drain mode.

3. The feed circuit according to claim 1, wherein the actuating fluid is air that surrounds the valve and which is substantially at the atmospheric pressure.

4. The feed circuit according to claim 1, wherein the feed circuit is an additive injection circuit, the liquid being an aqueous urea solution.

5. A feeding method, for the flow of a liquid in a motor vehicle, the feeding method comprising the consecutive steps of:
providing a feed circuit according to claim 1,
increasing the pressure of the liquid in the first chamber so that the valve operates in the feed mode, or
stopping the pump so that the valve operates in the latch mode, or
decreasing the pressure of the liquid in the first chamber so that the valve operates in the drain mode.

6. The feed circuit according to claim 1, wherein the valve further comprises a guide arranged in the second chamber and configured to guide the plug between the closed position and the open position.

7. The feed circuit according to claim 1, wherein the plug, the biasing member and the actuating member are sized so that, when in the feed mode, the force that is exerted on the plug and which results from the pressure of the liquid in the first chamber is higher than the sum of i) the force that is exerted on the plug and which results from the pressure of the liquid in the second chamber and ii) the biasing force that is exerted on the plug; and so that, when in the feed mode, the force that is exerted on the actuating member and which results from the pressure of the liquid in the first chamber is higher than the force that is exerted on the actuating member and which results from the actuating pressure.

8. The feed circuit according to claim 1, wherein the plug, the biasing member and the actuating member are sized so that, when in the latch mode, the force that is exerted on the plug and which results from the pressure of the liquid in the first chamber is lower than the sum of i) the force that is exerted on the plug and which results from the pressure of the liquid in the second chamber and ii) the biasing force that is exerted on the plug; and so that, when in the latch mode, the force that is exerted on the actuating member and which results from the pressure of the liquid in the first chamber is higher than or equal to the force that is exerted on the actuating member and which results from the actuating pressure.

9. The feed circuit according to claim 1, wherein the plug, the biasing member and the actuating member are sized so that, when in the drain mode, the force that is exerted on the plug and which results from the pressure of the liquid in the first chamber is lower than the force that is exerted on the plug and which results from the pressure of the liquid in the second chamber; and so that, when in the drain mode, the force that is exerted on the actuating member and which results from the actuating pressure is higher than the force resulting from i) the force that is exerted on the actuating member and which results from the pressure of the liquid in the first chamber, ii) the biasing force that is exerted on the plug, iii) the force that is exerted on the plug and which results from the pressure of the liquid in the first chamber, and iv) the force that is exerted on the plug and which results from the pressure of the liquid in the second chamber.

10. The feed circuit according to claim 1, wherein the actuating member comprises a membrane which is elastically deformable.

11. The feed circuit according to claim 1, wherein the valve comprises biasing means which are configured to urge the actuating member in the rest position.

12. The feed circuit according to claim 1, wherein the actuating member is disposed inside the first chamber, and wherein the first chamber presents a hole configured for conveying the actuating fluid toward the second face.

13. The feed circuit according to claim 1, wherein the valve further comprises an opening member disposed between the plug and the actuating member so as to transmit, to the plug, a force which results from the actuating pressure.

14. The feed circuit according to claim 13, wherein the opening member is generally in the form of a rod extending along an actuation direction, the opening member presenting, when viewed in section in a plane transverse to the actuation direction, recesses which are configured for the flow of the liquid substantially parallel to the actuation direction.

15. The feed circuit according to claim 1, wherein the first port is connected to the passage via a channel, and wherein the first chamber is connected to the first port via a connection port.

* * * * *